(12) United States Patent
Hanson

(10) Patent No.: US 7,752,717 B2
(45) Date of Patent: Jul. 13, 2010

(54) TENSIONING DEVICE FOR SECURING A LOAD

(76) Inventor: Burton W. Hanson, 1721 S. Ferry St., Apartment 19, Anoka, MN (US) 55303

( * ) Notice: Subject to any disclaimer, the term of this patent is extended or adjusted under 35 U.S.C. 154(b) by 0 days.

(21) Appl. No.: 12/173,373

(22) Filed: Jul. 15, 2008

(65) Prior Publication Data

US 2008/0273937 A1  Nov. 6, 2008

Related U.S. Application Data

(60) Division of application No. 11/594,495, filed on Nov. 7, 2006, now Pat. No. 7,412,754, which is a continuation of application No. 10/734,847, filed on Dec. 11, 2003, now Pat. No. 7,207,089.

(51) Int. Cl.
*B65D 63/16* (2006.01)

(52) U.S. Cl. ...................... 24/68 CD; 24/909

(58) Field of Classification Search .......... 24/68 R, 24/909, 68 CD, 69 CT, 69 ST, 71 ST, 71 TD; 254/217, 218, 237, 238, 222, 223, 243, 256, 254/250–252, 257
See application file for complete search history.

(56) References Cited

U.S. PATENT DOCUMENTS

| | | | |
|---|---|---|---|
| 1,001,547 A | 8/1911 | McMillen | |
| 1,287,050 A | 12/1918 | Kranz | |
| 2,946,563 A * | 7/1960 | Eaton | ............. 410/37 |
| 3,099,055 A | 7/1963 | Huber | |
| 3,409,263 A | 11/1968 | Jantzen | |
| 3,848,889 A | 11/1974 | Sharrow | |
| 4,155,537 A | 5/1979 | Bronson et al. | |
| 4,199,182 A | 4/1980 | Sunesson | |
| 4,227,286 A | 10/1980 | Holmberg | |
| 4,324,022 A | 4/1982 | Prete, Jr. | |
| 4,570,305 A | 2/1986 | Smetz et al. | |
| 4,584,742 A | 4/1986 | Speich | |
| 4,913,608 A | 4/1990 | Royball | |

(Continued)

FOREIGN PATENT DOCUMENTS

DE  30 17 371 A1  11/1981

(Continued)

OTHER PUBLICATIONS

Highland™ The Pro's Brand catalog, "Cargo Management," pp. 2-31 (2003).

(Continued)

*Primary Examiner*—James R Brittain
(74) *Attorney, Agent, or Firm*—Merchant & Gould P.C.

(57) ABSTRACT

A tensioning device is configured to wind a threadable tensioning line, particularly a belt or a web, the proximal end of which is threaded through a first end of the device and attached to an opposite end of the device. A frame of the tensioning device can be fastened to a support surface. A ratcheting system included in the device winds the proximal end of the threadable tensioning line by means of a pivot handle. The threadable tensioning line is tightened when the handle is pivoted in a drive stroke. An embodiment of the tensioning device includes a ratcheting system that drives the tensioning device when the pivot handle is pulled toward the user in a drive stroke.

15 Claims, 12 Drawing Sheets

U.S. PATENT DOCUMENTS

| | | | |
|---|---|---|---|
| 5,156,506 A | 10/1992 | Bailey | |
| 5,271,606 A | 12/1993 | Kämper | |
| 5,426,826 A | 6/1995 | Takimoto | |
| 5,611,520 A | 3/1997 | Söderström | |
| 5,778,496 A | 7/1998 | Huang | |
| 5,832,569 A | 11/1998 | Berg | |
| 5,853,164 A | 12/1998 | Hunt | |
| 5,904,341 A | 5/1999 | Norrby | |
| 6,007,053 A | 12/1999 | Huang | |
| 6,102,371 A | 8/2000 | Wyers | |
| 6,139,234 A | 10/2000 | Huang | |
| 6,195,848 B1 | 3/2001 | Jackson et al. | |
| 6,279,847 B1 | 8/2001 | Berger | |
| 6,322,302 B2 | 11/2001 | Horton | |
| 6,398,470 B1 | 6/2002 | Mosley | |
| 6,406,230 B1 | 6/2002 | Mason et al. | |
| 7,207,089 B2 | 4/2007 | Hanson | |

FOREIGN PATENT DOCUMENTS

| | | |
|---|---|---|
| DE | 88 12 045.7 | 12/1988 |
| EP | 0 311 828 A2 | 9/1988 |

OTHER PUBLICATIONS

Kinedyne Corporation catalog, "Kinedyne® Cargo Control Systems," pp. 2-43 (1996).

Kinedyne Corporation catalog, "Kinedyne® Cargo Control, Flatbed-Interior Van-Rail-Air," pp. various (2003).

Kinedyne Corporation Catalog No. CC300, "Kinedyne® Cargo Control Systems," pp. 2-55 (© 2000).

Kinedyne Corporation Catalog No. KCP007, "Kinedyne® The Cargo Control People! Flatbed Trailer Products," pp. 2-11 (© 2002).

SpanSet, Inc. Brochure, "Quality and Service. Our Commitment To You.," pp. 1-25 (© 2002).

* cited by examiner

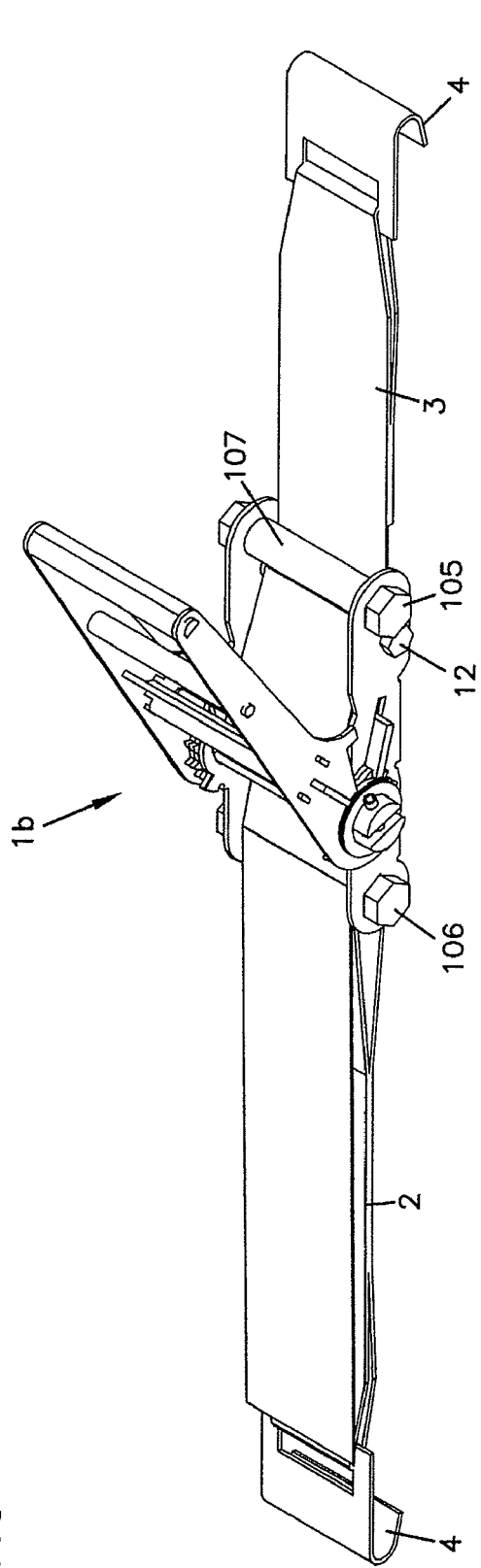

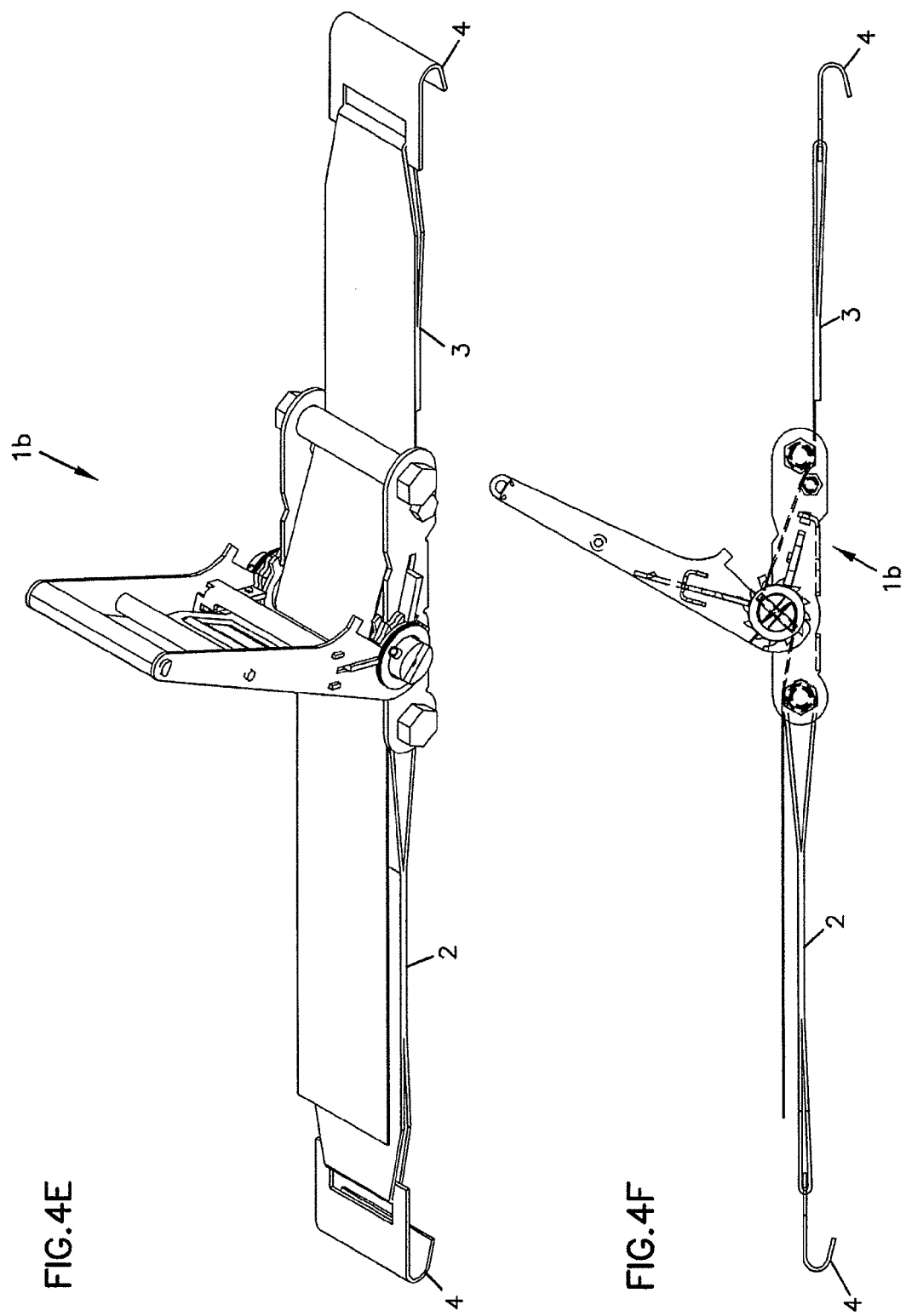

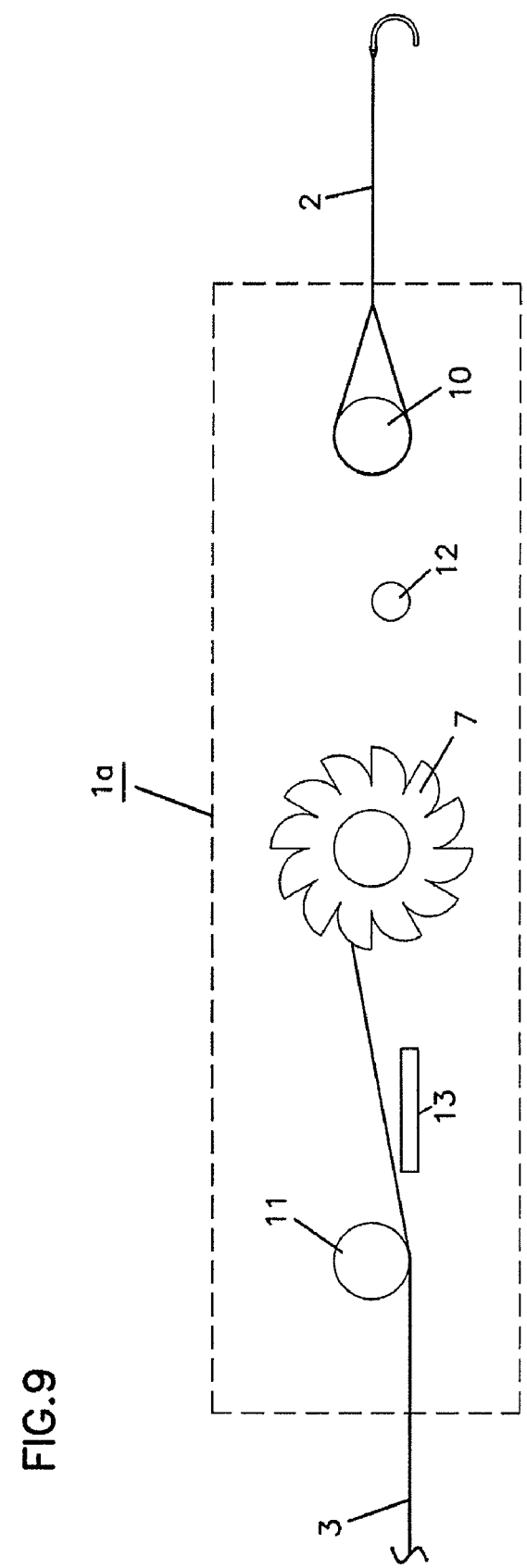

TENSIONING DEVICE FOR SECURING A LOAD

CROSS-REFERENCE TO RELATED APPLICATION

The present application is a divisional of U.S. patent application Ser. No. 11/594,495, filed Nov. 7, 2006, now U.S. Pat. No. 7,412,754, which is a continuation of U.S. patent application Ser. No. 10/734,847 now U.S. Pat. No. 7,207,089, filed Dec. 11, 2003, and which application(s) are incorporated herein by reference.

FIELD OF THE INVENTION

The invention relates generally to a system for tensioning cargo retaining members to secure a load to a support surface. More particularly, the invention relates to a bi-directional ratchet device for tensioning a first anchoring line and a second threadable line, the threadable line extending over the load to secure the load to a semi-trailer.

BACKGROUND

Tensioning systems for tensioning lines, particularly belts or webs, utilizing a ratcheting device to wind the tensioning lines have been used for many years. Systems of this type are typically comprised of an anchoring tensioning line, a threadable tensioning line, and a ratchet device. An example of an environment in which these types of devices are employed is in tightening lines around loads or cargo placed on semi-trailer flatbeds.

More specifically, prior art devices typically include a means to attach the proximal end of a first or anchoring tensioning line to a first end of the device and a ratchet system to wind the proximal end of a second or threadable tensioning line from the second end of the device. The distal end of the anchoring line is attached to a metal fastener. The fastener attaches the anchoring line to one side of a support surface (e.g., one side edge of the flatbed trailer). The distal end of the threadable tensioning line also includes a metal faster so that it can be fastened to the opposing side edge of the support surface (e.g., the second side edge of the flatbed trailer). The proximal end of the threadable tensioning line is placed over the vehicle load and threaded into the ratchet mechanism of the device.

The ratcheting system of the device comprises a rotatable drive element serving to wind the threadable line, at least one ratchet wheel connected integrally in rotation to the drive element and exhibiting directionally oriented notches, and a pivot lever serving to introduce the rotary movement into the drive element, on which a drive pawl cooperating with the ratchet wheel is mounted slidably counter to the action of a spring, whilst the notches of the ratchet wheel are shaped so that they are retained firmly by a blocking pawl during movement of the pivot lever towards the first end of the device, whereas during the movement of the pivot lever towards the second end of the device, they are entrained via the drive pawl.

The prior devices, however, have all suffered from the same drawback, namely that the direction of the power stroke is set for each particular device. The power stroke refers to the direction in which the pivot lever is moved in order to entrain the notches of the ratchet wheel. Originally, the power stroke of a typical tensioning device was towards the second end of the device. This was known as a "push" power stroke device. Such a device is disclosed in U.S. Pat. No. 4,199,182.

However, this device was burdensome to vehicle loaders since it often required them to push up from the ground in order to wind the threadable line. This was because the anchoring line was often shorter than the threadable line. This caused the tensioning device to be oriented such that the second end of the device was remote from the support surface. Speich, U.S. Pat. No. 4,584,742, disclosed a tensioning device with a "pull" power stroke. This device had a power stroke pivoting towards the first end of the device. This was advantageous in that it allowed a user to employ his or her body weight to assist in moving the pivot lever. However, in order to release the mechanism the pivot lever must still be activated with a "push" stroke.

However, the "push" power stroke device would still be advantageous under certain circumstances. For instance, if the anchoring line was longer than the threadable line, then the device would be oriented such that the first end of the device would be remote from the support surface. Therefore, a user would only be able to utilize his or her body weight with a "push" power stroke. No prior art devices have allowed the user the ability to switch the direction of the power stroke to suit the needs of a particular situation.

Therefore, there arises a need for a bi-directional load securing ratchet method and apparatus. Preferably such an apparatus and method provides for easily converting the power stroke from push to pull modes. The present invention directly addresses and overcomes the shortcomings of the prior art.

SUMMARY

The invention is a bi-directional load securing ratchet method and apparatus system. The principles of the present invention may be employed in a ratchet style device. In one preferred embodiment constructed according to the principles of the present invention, the apparatus includes a ratchet, an anchoring tensioning line, and a threadable tensioning line. The tensioning system permits bi-directional tensioning. In other words, the claimed invention permits the threadable line to be wound up from either end of the ratcheting device. Therefore, the invention allows the user the freedom to choose the direction of the power stroke. Accordingly, among other advantages, devices constructed in accordance with the principles of the present invention allow a user to purchase a single ratchet that performs both a pull and a push function.

In one embodiment of the system, the ratcheting device includes a second anchoring line attachment means coupled to the second end of the device. The anchoring line may be removably attached to either end of the device. The threadable line is then fed thread-like into the device from the end remote from the attached anchoring line. A first guide means has been added next to the first anchoring line attachment means to help feed in the threadable line from the first end of the device. A second guide means, added between the drive element and the second anchoring line attachment means, aids in feeding the threadable line through from the second end of the device.

In the embodiment described above, the cam of each directionally oriented notch on the ratchet wheel is remote from the first end of the device. Alternatively, the device may be embodied such that the cam of each directionally oriented notch on the ratchet wheel is remote from the second end of the device.

In another alternative embodiment of the invention, the drive pawl and/or the blocking pawl may be of pivotal, rather than slider-like construction.

According to one aspect of the invention, the area under the drive pawl is arranged and configured to better accommodate winding up the threadable line. According to another aspect of the invention, the drive pawl includes a handle by which it may be actuated while the users hand is placed on the power stroke handle. According to yet another aspect of the invention, a control cam, by which the blocking pawl may be rendered inoperable, is comprised of the pivot lever.

One feature of the invention is that the first guide means helps to prevent the threadable line and the blocking mechanism from interfering with one another. Another feature is the inclusion of a retaining stub on the body of the device to insure that the handle does not move from its final closed "transit" position (e.g., after tightening of the strap over the load occurs). Still another feature is the use of a guide slot to allow feeding of the strap over or under the end guide at the first end of the device. This feature provides further flexibility in utilizing the ratchet in connection with a number of various loads and situations.

Still another feature of the present invention is the design of the tensioning handle (e.g., the drive imparting member), as well as other components, in a manner that preserves the strength of the component parts.

In another embodiment, the device may be set up in a pull mode arrangement and connected to the side edge of an open top trailer. In this configuration, the device can secure a top tarp or other cover. In this embodiment, a guide bar with a slot may be used at the second end. The strap may then be located through the slot.

Therefore, in accordance with one aspect of the present invention, there is provided a bi-directional tensioning device for tensioning an anchoring line and a threadable line comprising: a ratcheting system serving to wind the threadable line; a first and second anchoring line attachment means positioned on opposite ends of the ratcheting system, wherein the anchoring line may be removably attached to either anchoring line attachment means; and a first and second guide means serving to aid in winding the threadable line.

In accordance with another aspect of the invention, there is provided a bi-directional tensioning device for tensioning an anchoring line and a threadable line comprising: a ratcheting means for winding the threadable line; a first and second anchoring line attachment means positioned on opposite ends of the ratcheting system, wherein the anchoring line may be removably attached to either anchoring line attachment means; and a first and second guide means serving to aid in winding the threadable line.

In accordance with a further aspect of the invention, there is provided a bi-directional tensioning device for tensioning an anchoring line and a threadable line comprising: two spaced parallel plate members; a rotatable drive element mounted between the plate members; at least one ratchet wheel integrally connected to the rotatable drive element, wherein the ratchet wheel includes directionally oriented notches; a pivot lever mounted on the drive element; a drive pawl pivotably attached to the pivot lever; a blocking mechanism operationally coupled to the plate members, wherein the blocking mechanism comprises a blocking pawl, a support surface interconnecting the plate members, and a spring mounted on the support surface, wherein the spring braces blocking pawl into blocking engagement with the ratchet wheel; a first and second anchoring line attachment means interconnecting the parallel plate members at remote ends of the device, wherein the anchor line may be removable attached to either anchoring line attachment means; and a first and second guide means serving to aid in winding the threadable line.

According to a method aspect of this invention there is provided a method for changing the direction of the power stroke associated with a bi-directional tensioning device of the type having a first and second anchoring line attachment means from "push" to "pull" comprising: detaching the threadable line from the ratcheting system of the bi-directional tensioning device; detaching the anchoring line from the first anchoring line attachment means; attaching the anchoring line to the second anchoring line attachment means; and feeding the threadable tensioning line into the ratcheting system from the first end of the device.

According to a second method aspect, there is provided a method for changing the direction of the power stroke associated with a bi-directional tensioning device of the type having a first and second anchoring line attachment means from "pull" to "push" comprising: detaching the threadable line from the ratcheting system of the bi-directional tensioning device; detaching the anchoring line from the second anchoring line attachment means; attaching the anchoring line to the first anchoring line attachment means; and feeding the threadable tensioning line into the ratcheting system from the second end of the device.

While the invention will be described with respect to preferred embodiment configurations and with respect to particular components used therein, it will be understood that the invention is not to be construed as limited in any manner by either such configuration or components described herein. Instead, the principles of this invention extend to any bi-directional load securing ratchet method and apparatus system. Further, while the preferred embodiments of the invention will be generally described in relation to securing a cargo or load on a semi-trailer flatbed, it will be understood that the scope of the invention is not to be so limited to that particular environment. For example, the device may be utilized in other representative environments such as ocean transport, inside boxcars, airplanes, trucks and vans. Further, the device may be used to secure wood, pipes, in agricultural environments, etc. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawing which forms a part hereof and to the accompanying descriptive matter, in which there is illustrated and described a preferred embodiment of the invention.

BRIEF DESCRIPTION OF THE DRAWINGS

Referring to the drawing, wherein like numerals represent like parts throughout the several views:

FIGS. 4A-4J shows a sequential series of views with the device utilizing a "pull" powerstroke.

FIG. 9 illustrates one embodiment of a bi-directional tensioning device including a cam of each directionally oriented notch on the ratchet wheel is remote from the second end of the device.

DETAILED DESCRIPTION

Figure 1:
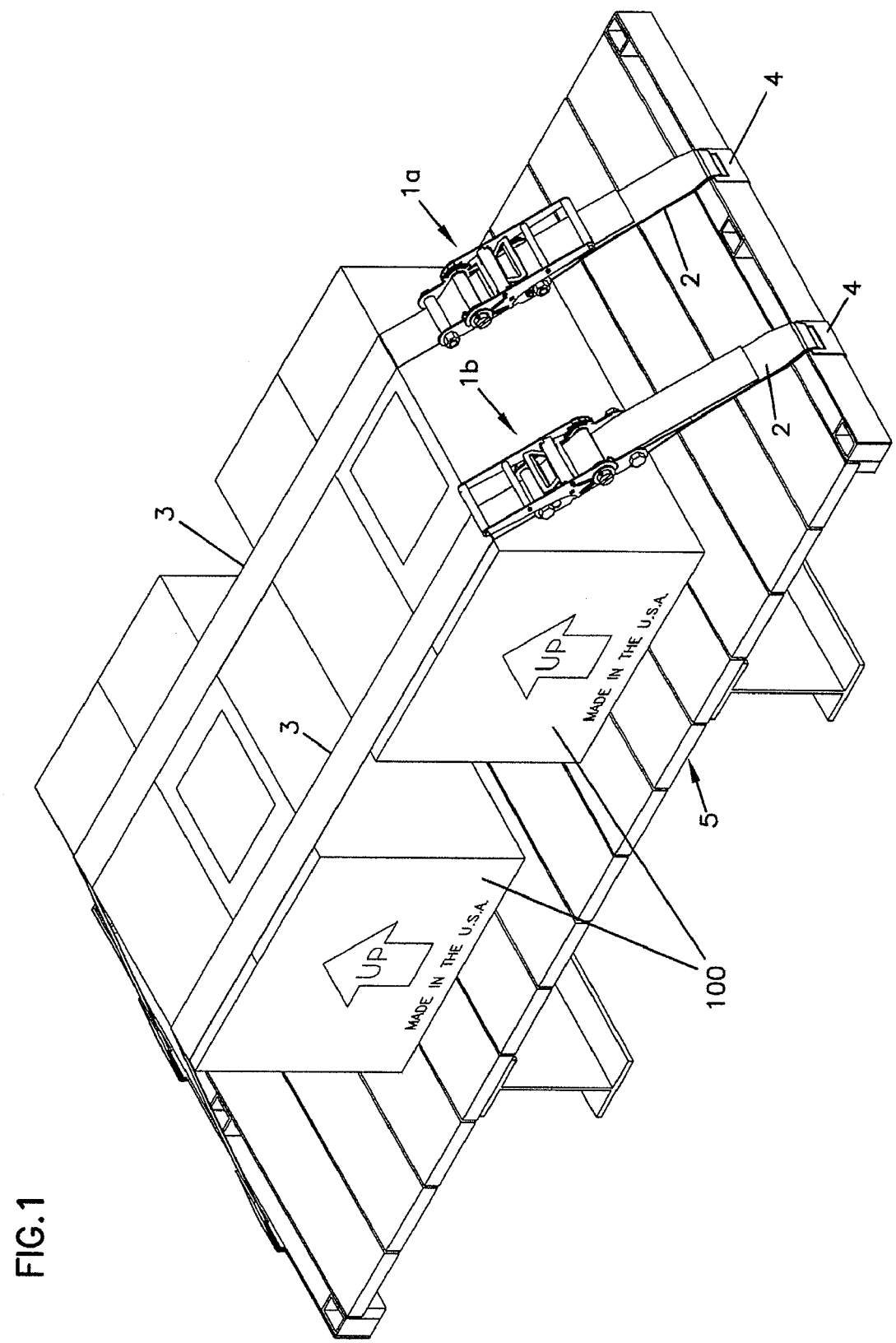
FIG. 1 shows the bi-directional load securing ratchet method and apparatus system constructed in accordance with the principles of the invention (including the bi-directional tensioning device, the anchoring line, and the threadable line) utilized in both a push mode and a pull mode.

The bi-directional tensioning system, illustrated in FIG. 1, is comprised of a bi-directional tensioning device 1a and 1b, an anchoring line 2, and a threadable line 3. Both lines 2 and 3 have a proximal end and a distal end. The tensioning device 1a and 1b has a first end and a second end (best seen in FIG. 2). The tensioning device 1a is utilized in a "push" power stroke mode, while the tensioning device 1b is utilized in a "pull" power stroke mode. While the components between the devices 1a and 1b are identical, the anchoring line 2 is connected at opposite ends of the device 1a and 1b. Therefore, if the device 1a and 1b is desired to be utilized in the other manner, the device merely needs to be turned around 180 degrees, the anchoring line 2 attached to the other end of the device 1a and 1b, and the threadable line 3 threaded from the other end.

Still referring to FIG. 1, the second end of the tensioning device 1a is coupled to the proximal end of the threadable line 3. The first end of the tensioning device 1a is coupled with the proximal end of the anchoring line 2. The first end of the tensioning device 1b is coupled to the proximal end of the threadable line 3. The second end of the tensioning device 1b is coupled with the proximal end of the anchoring line 2. In either case, the distal ends of the anchoring line 2 and the threadable line 3 are each attached to the support surface 5 by means of a fastener 4. The threadable line 3 extends over a load 100 to secure the load 100 to the support surface 5.

Figure 2:
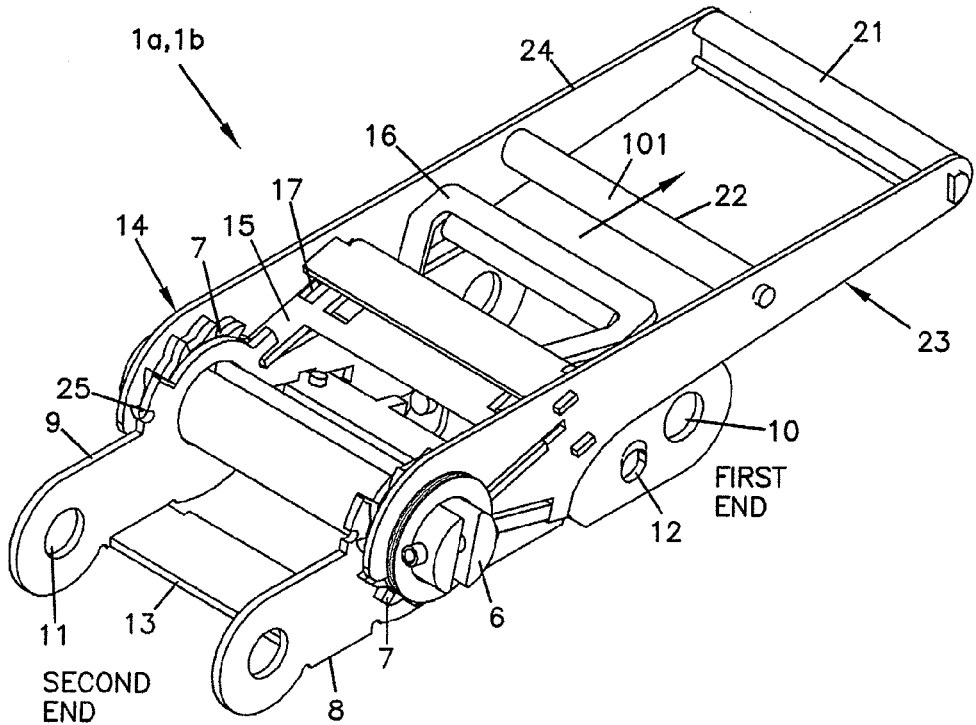
FIG. 2 shows a perspective view of an embodiment of the device of FIG. 1.
Figure 3:
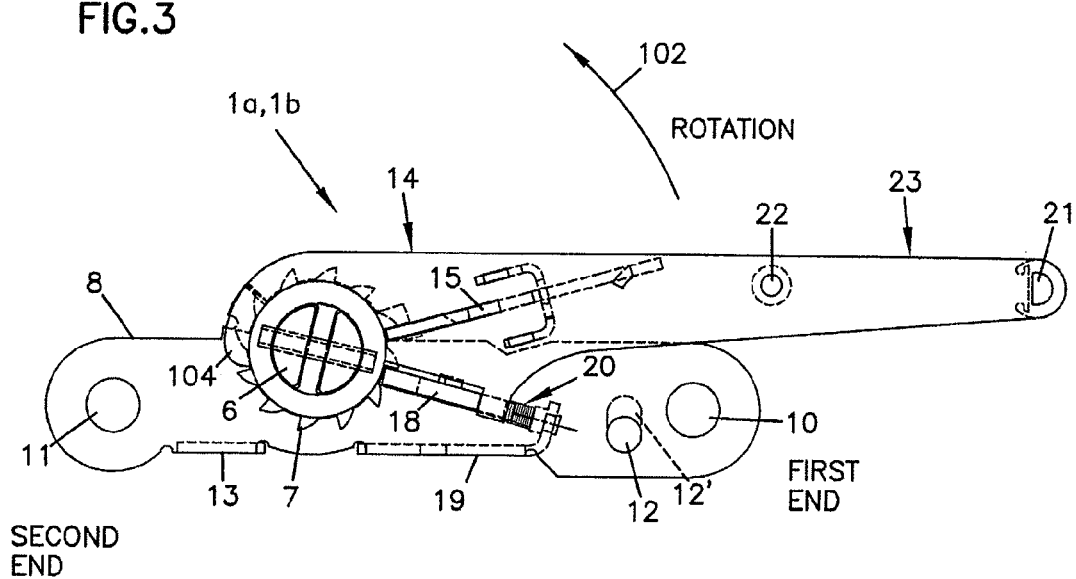
FIG. 3 shows an elevational side view of the device of FIG. 1 with portions shown in phantom.

FIGS. 2 and 3 further illustrate the bi-directional tensioning device 1a and 1b. Since the anchoring line 2 and the threadable line 3 are not yet attached, the device as shown in FIGS. 2 and 3 is essentially shown in its generic state and can be employed in either the push mode (designated as 1a) or pull mode (designated as 1b) by connecting the lines at the appropriate ends. Accordingly, the various components need only be discussed once in connection with FIGS. 2 and 3.

A person of skill in the art will generally understand the basic principles of how a ratchet device operates. However, a brief discussion will be set forth below. Further discussion of the operation of such ratchets may be found in, for example, U.S. Pat. Nos. 4,227,286; 4,584,742; and 5,271,606.

Rotatable drive element 6 serves to wind the threadable line 3 (shown in FIG. 1). At least one ratchet wheel 7 is connected integrally in rotation to the drive element 6, wherein the ratchet wheel 7 exhibits directionally oriented notches. Mounted on the rotatable drive element 6, are two spaced parallel plate members 8, 9 interconnected by means of support surfaces 13 and 19 (see FIG. 3). Also mounted on the rotatable drive element 6 is a drive introducing member 14. The drive introducing member 14 comprises two spaced, generally parallel extension members 23, 24 interconnected by a spacer bolt 22 and a handle 21. A U-shaped pawl 15 is coupled to the drive imparting member 14, wherein the pawl 15 cooperates with the ratchet wheel 7 and is mounted slidably counter to the action of a spring 17. Rotary motion is imparted into the drive element 6 by rotating the drive introducing member 14 back and forth from one end of the tensioning device 1 to the other. Therefore, in operation, the drive imparting member 14 is grasped at handle 21 by an operator to wind the tensioning threadable line 3 about the rotatable drive element to secure the load 100.

Spring loaded locking mechanism 18 cooperates with the ratchet wheel 7 to keep the ratchet wheel in place during the return stroke of the drive introducing member 14. Preferably a detent area 103 engages a flange of the locking mechanism 18 that extends outside of the area defined by the side members 8, 9 so that the tension in the line 3 is not inadvertently released when the drive introducing member 14 is in its closed final position.

Figure 6:
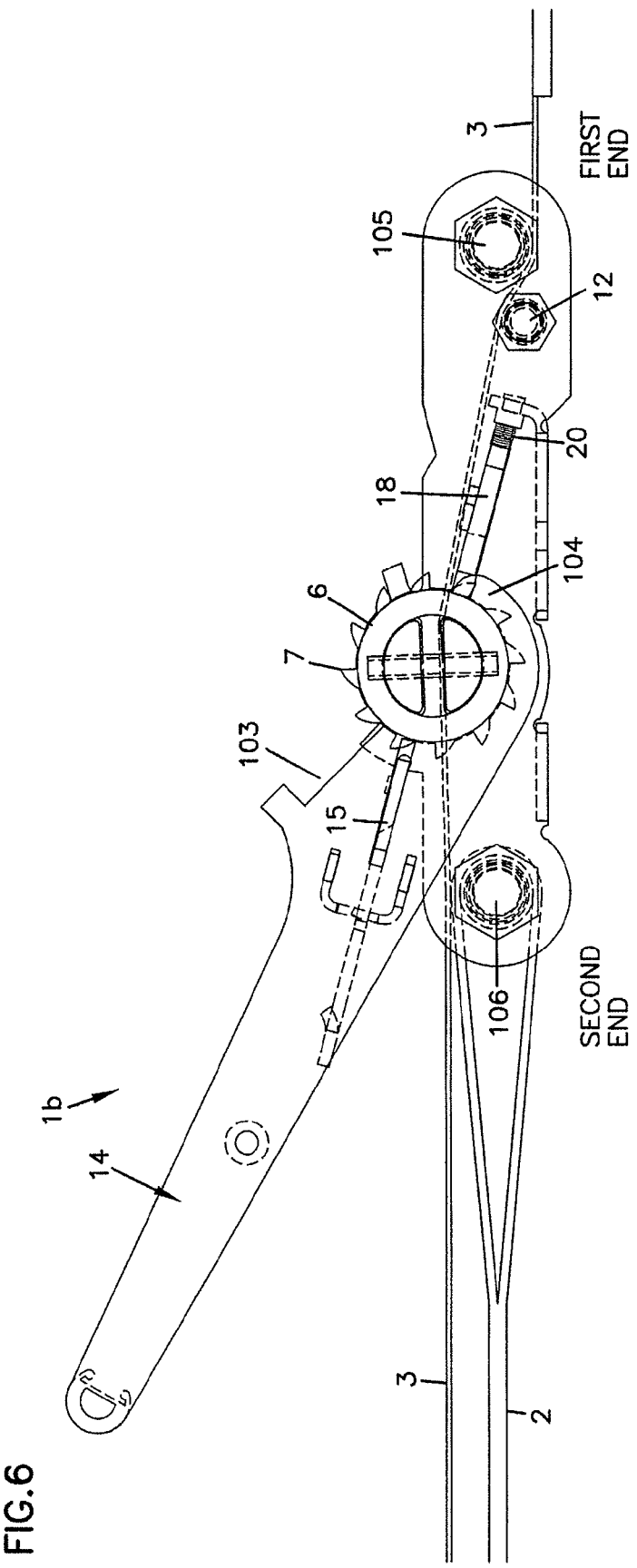
FIG. 6 illustrates a schematic side view of the device set up in the "pull" powerstroke mode with the tensioning lines in place.

To release the tension on threadable line 3, handle 16 may be operated in the direction of the arrow 101 to release the pawl 15 from the ratchet wheel 7 and to move the drive introducing member to a fully opened position (best seen in FIG. 6). In this position, a control cam 25, located on plate members 8, 9 is included to keep the pawl 15 entirely away from the ratchet wheel 7. Further, in this position a cam element 104 engages the locking mechanism 18 and urges it against its spring 20. This raises the locking mechanism 18 from the ratchet wheel 7 thereby releasing the tension. The handle 16 is pulled in the direction of the arrow designated 101 to overcome the tension provided by spring 17.

FIG. 3 illustrates in phantom the blocking mechanism comprising a blocking pawl 18, a support surface 19, and a spring 20. The spring 20 is mounted to the support surface 19 and braces the blocking pawl 18 into the ratchet wheel 7. The notches of the ratchet wheel 7 are shaped so that they are firmly retained by the blocking pawl 18 during movement of the drive imparting member 14 in one direction, whereas during the movement of the drive imparting member 14 in the other direction they are entrained by the drive pawl 15.

The location for the first and second anchoring line attachment means (best seen in FIG. 6) are designated at 10 and 11. The locations are formed in interconnecting plate members 8, 9 at opposite remote ends. The proximal end of the anchoring line 2 may be attached at either of the anchoring line attachment means locations 10 and 11. The proximal end of the threadable line may then be threaded through the drive element 6 from the end of the device remote from the attached anchoring line. A first guide means 12 is located between the two parallel plates 8, 9 and is spaced between the first anchoring line attachment means location 10 and the support surface 19. A second guide means 13 is positioned between the rotatable drive element 6 and the second anchoring line attachment means location 11 so that it also interconnects the two parallel plate members 8, 9.

The first guide means 12 may be positioned as shown in a fixed location, or it may be located in an optional oval opening designated in phantom at 12'. By utilizing an oval hole, the line may be threaded either over or under the first guide means. This provides for additional flexibility when utilizing the system. The threadable line 3 may be threaded over or under the first anchor line attachment means (described further below) depending on its orientation over or under the first guide means 12.

It is possible to design the device with the notches of the ratchet going in either direction. More specifically, because the tensioning device 1 is bi-directional, the notches of the ratchet wheel 7 may also be oriented to either the first or second end of the tensioning device 1a and 1b (i.e., as viewed in FIG. 3 at the top of the device in that view). If the notchbacks are remote from the first end of the device, as shown in FIG. 2, then the drive pawl 15 will entrain the notches when the user pivots the drive imparting member 14 towards the second end of the device 1a and 1b. This rotation is designated by the arrow 102. Alternatively, if the notchbacks are remote from the second end of the device 1a and 1b (not shown), then the drive pawl 15 will entrain the notches when the user pivots the drive part 14 towards the first end of the device.

Turning now to FIG. 6, the device 1b is shown in pull mode. Also shown are first anchor line attachment means 105 and second anchor line attachment means 106. In the pull mode, the anchor line 2 is connected to the second anchor line attachment means 106 at the second end (e.g., located through the anchor line attachment location 11). In this mode, the first anchor line attachment means 105 is located through anchor line attachment location 10 and functions as a guide for the threadable line 3. The first and second anchor line attachment means 105, 106 may be steel bolts and may include a bushing 107 (best seen in FIG. 4c) to provide sliding of the strap over the surface. Threaded machine head bolts provide a relatively easy and well known means for changing the anchor line 2 from the first end to the second end. However, other devices, such as cotter pins, spring loaded fasteners and the like might also be used to enable removal of the anchor line 2 from one of the anchor line attachments and attachment to the other.

In FIG. 6, the threadable line 3 is shown going under the first anchor line attachment means and over the guide 12. The threadable line 3 then extends through the center of the rotatable drive element 6. In this manner, the threadable line 3 does not require any other attachment to the device in order to be securely fastened during the tensioning process.

Figure 4A:
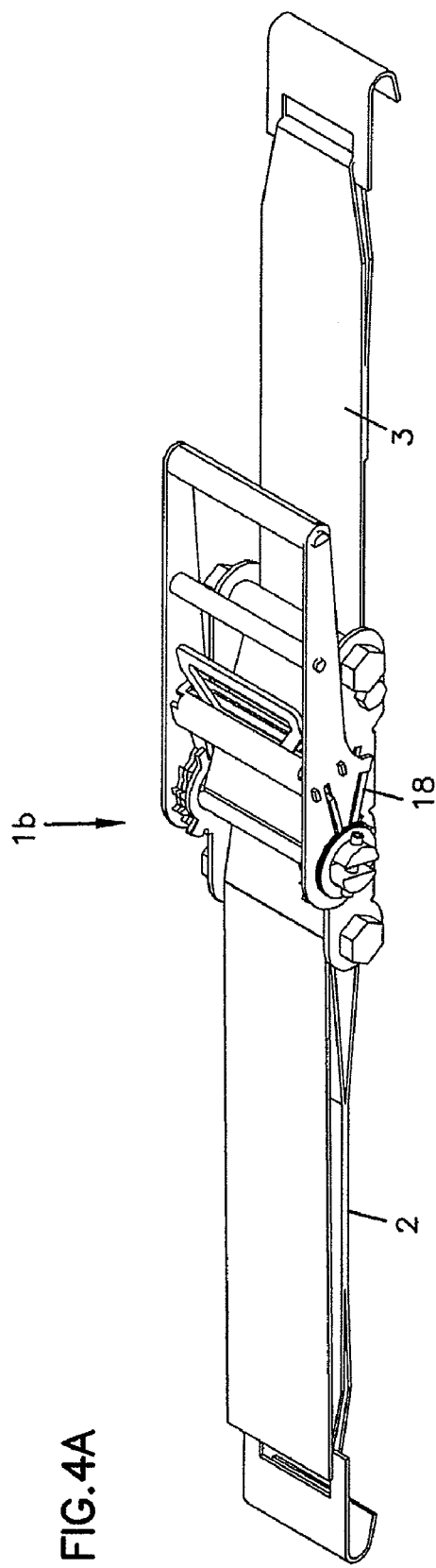
Figure 4B:
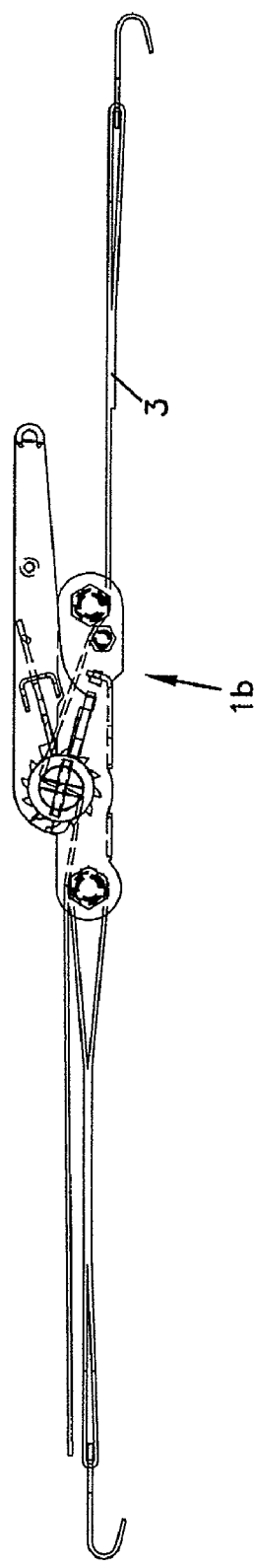
Figures 4G, 4H:
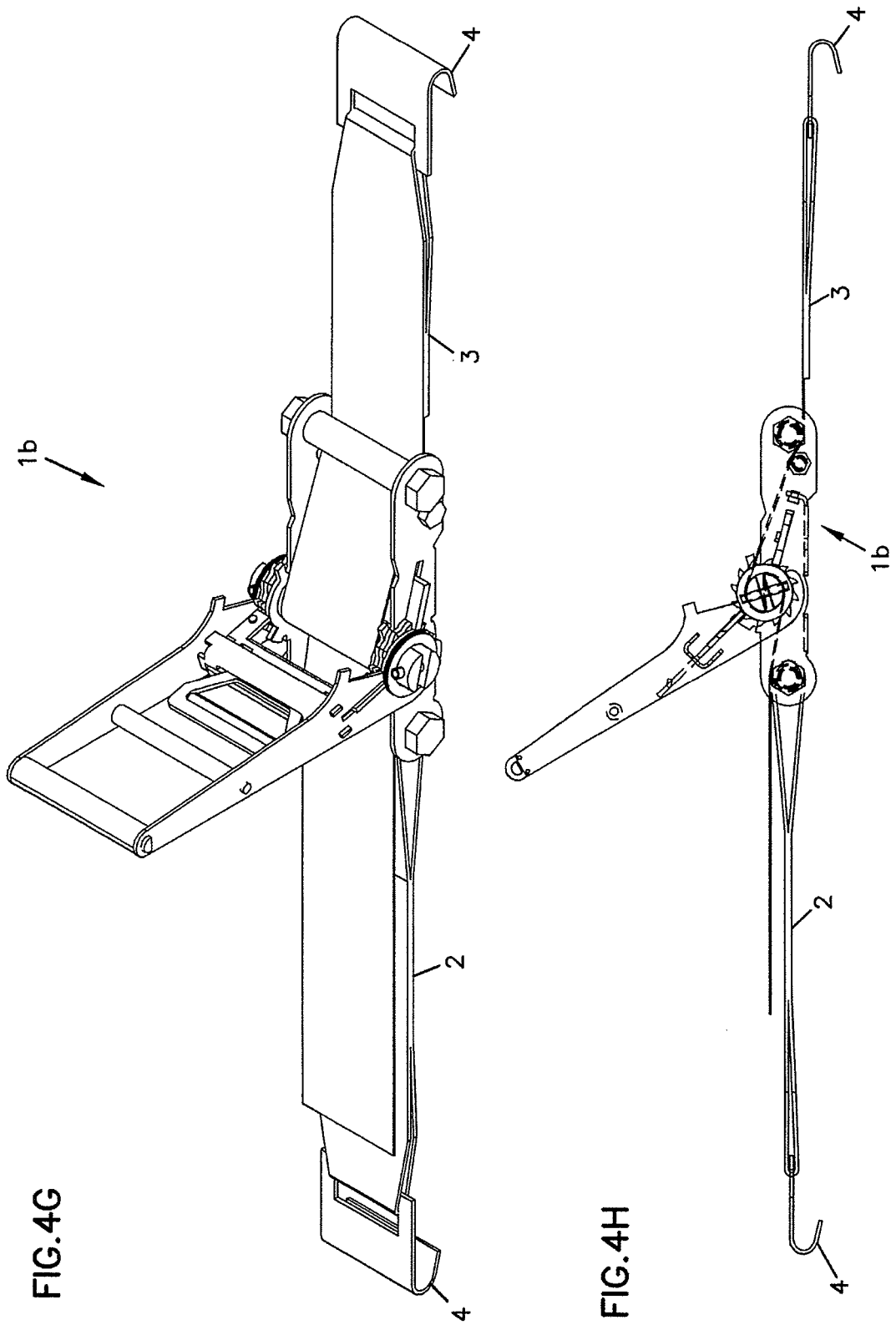
Figure 4I:
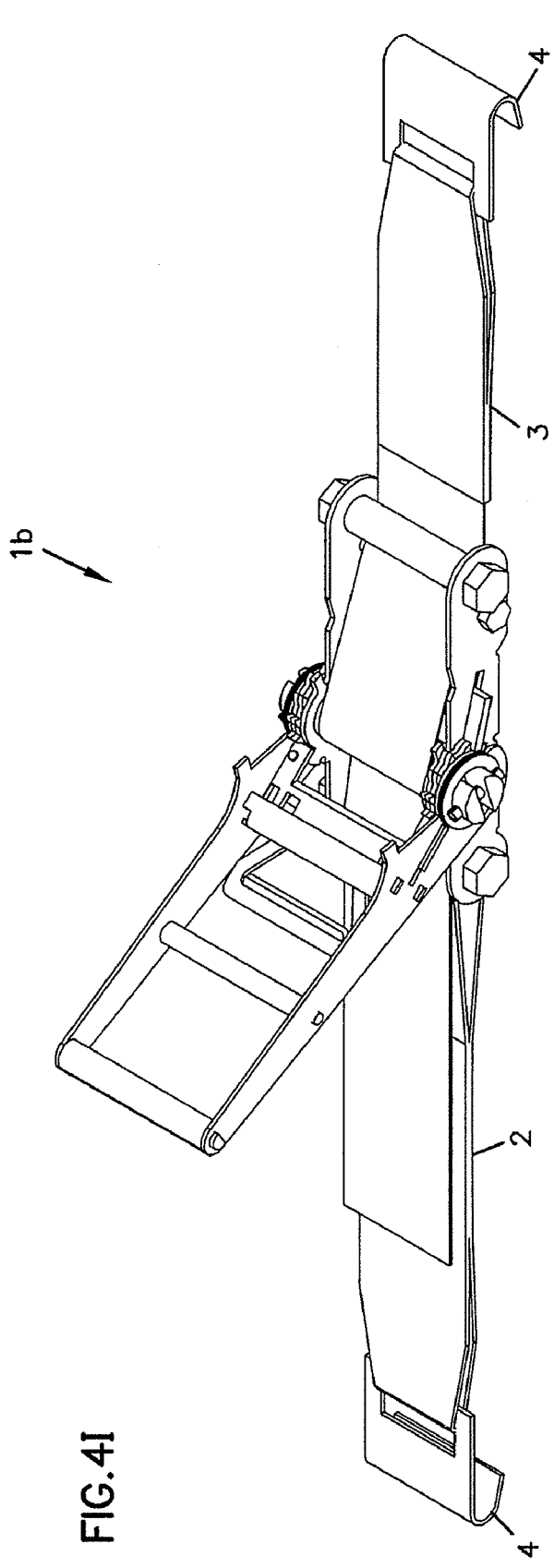
Figure 4J:
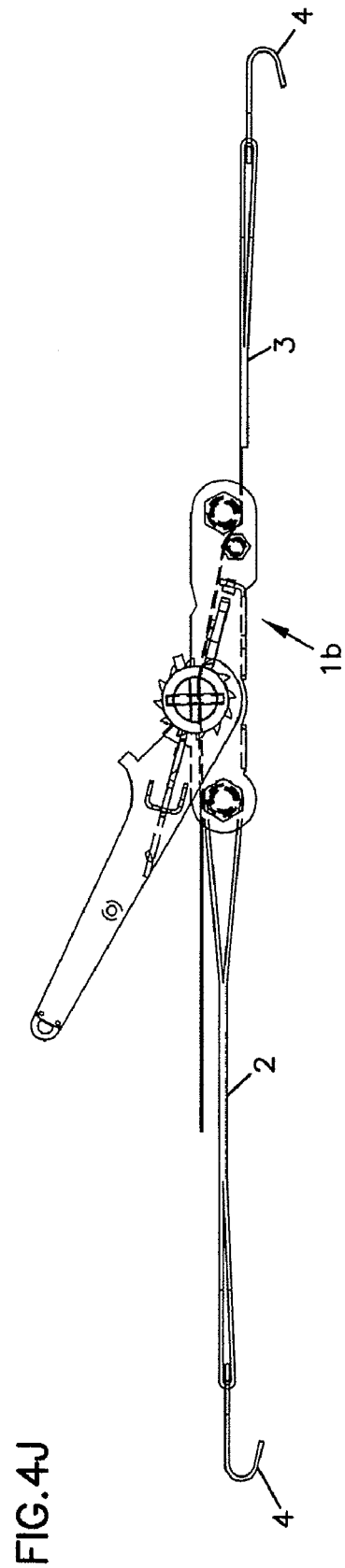

FIGS. 4A-4J provide a series of illustrations of the device 1b in the pull mode. FIGS. 4A, 4C, 4E, 4G, and 4I are perspective views that illustrate the pull mode stroke. FIGS. 4B, 4D, 4F, 4H, and 4J are schematic side elevation views corresponding to FIGS. 4A, 4C, 4E, 4G, and 4I respectively. FIGS. 4A and 4B illustrate the closed position. In this position, the spring loaded member 18 is locked by detent area 103. FIGS. 4C and 4D illustrate the drive imparting member 14 rotating in the direction of arrow 102 (best seen in FIG. 2) with the pawl 15 engaging the ratchet wheel 7. This causes the rotation member 6 to rotate and begin to take up the threadable line 3. As the threadable line 3 is shortened, then tension is increased. Once tension reaches an acceptable level, then cargo 100 can be secured. FIGS. 4E and 4F illustrate the drive imparting member 14 continuing to rotate. FIGS. 4G and 4H illustrate a continuation of the power stroke, while FIGS. 4I and 4J illustrate the completion of the power stroke. At this point, the drive imparting member 14 would be returned to the closed position of FIGS. 4A and 4B for another stroke (if required).

Figure 5A:
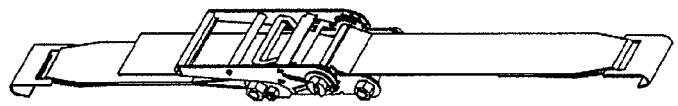
FIGS. 5A-5L shows a sequential series of views with the device utilizing a "push" powerstroke.
Figure 5B:
Figure 5C:
Figure 5D:
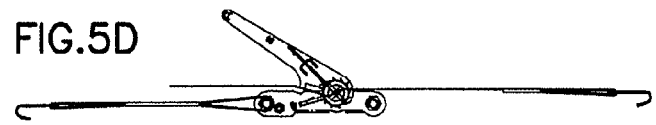
Figure 5E:
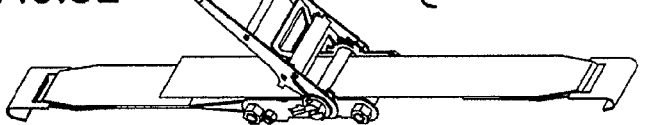
Figure 5F:
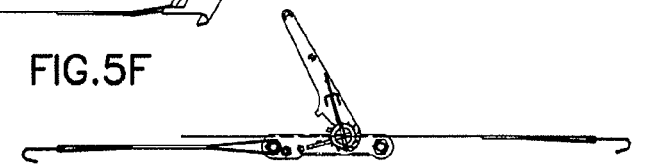
Figure 5G:
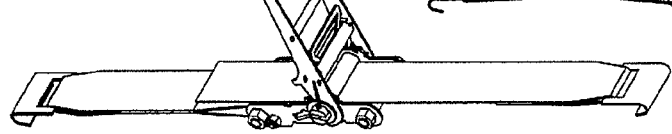
Figure 5H:
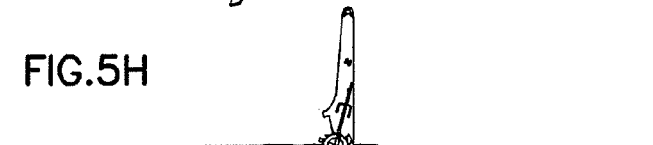
Figure 5I:
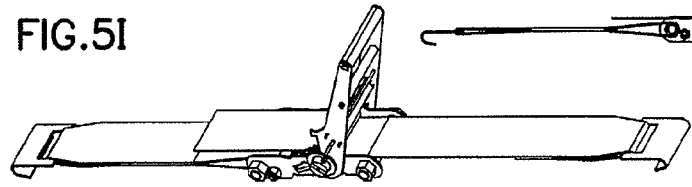
Figure 5J:
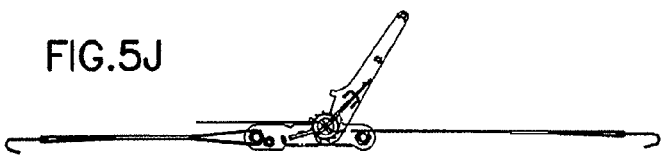
Figure 5K:
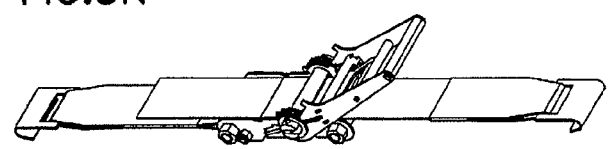
Figure 5L:

FIGS. 5A-5L provide a series of illustrations of the device 1a in the push mode. FIGS. 5A, 5C, 5E, 5G, 5I and 5K are perspective views that illustrate the pull mode stroke. FIGS. 5B, 5D, 5F, 5Hh, 5J and 5L are schematic side elevation views corresponding to FIGS. 5A, 5C, 5E, 5G, 5I and 5K respectively. It should be noted that the anchor line 2 is connected to the first end of the device 1a (i.e., to first anchor line attachment means 105). FIGS. 5A and 5B illustrate the closed position. In this position, the spring loaded member 18 is locked by detent area 103. FIGS. 5C and 5D illustrate the drive imparting member 14 rotating in the direction of arrow 102 (best seen in FIG. 2) with the pawl 15 engaging the ratchet wheel 7. This causes the rotation member 6 to rotate and begin to take up the threadable line 3. As the threadable line 3 is shortened, then tension is increased. Once tension reaches an acceptable level, then cargo 100 can be secured. FIGS. 5E and 5F, 5G and 5H, and 5I and 5J illustrate the drive imparting member 14 continuing to rotate and the continuation of the power stroke. FIGS. 5K and 5L illustrate the completion of the power stroke. At this point, the drive imparting member 14 would be returned to the closed position of FIGS. 5A and 5B for another stroke (if required).

Second Embodiment

Figure 7A:
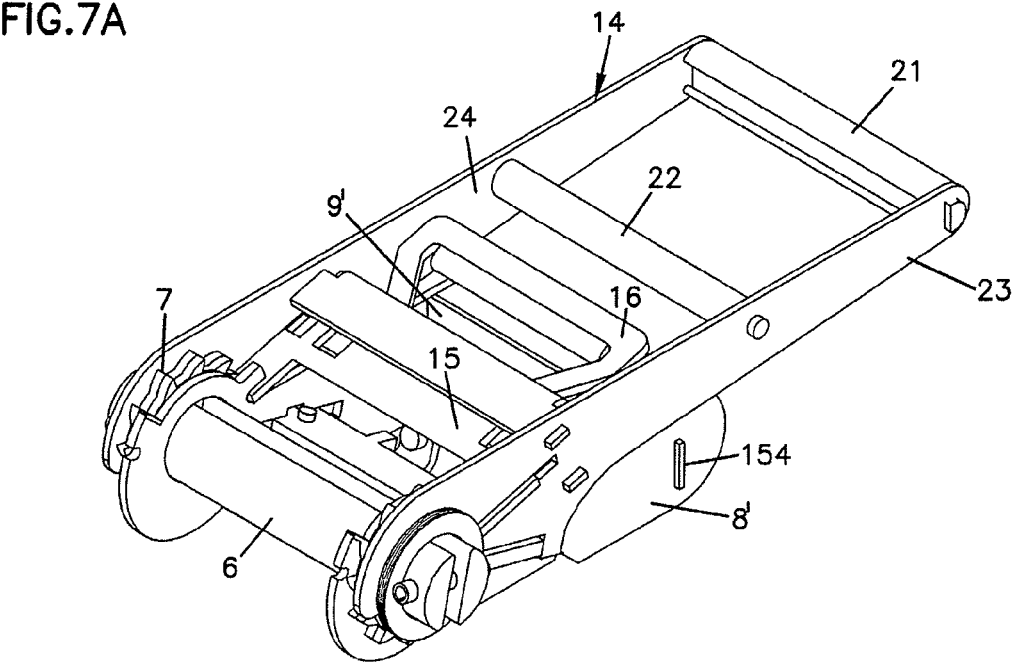
FIGS. 7A and 7B illustrate a second embodiment wherein the device is utilized in a "pull" mode in connection with an open top trailer.
Figure 7B:
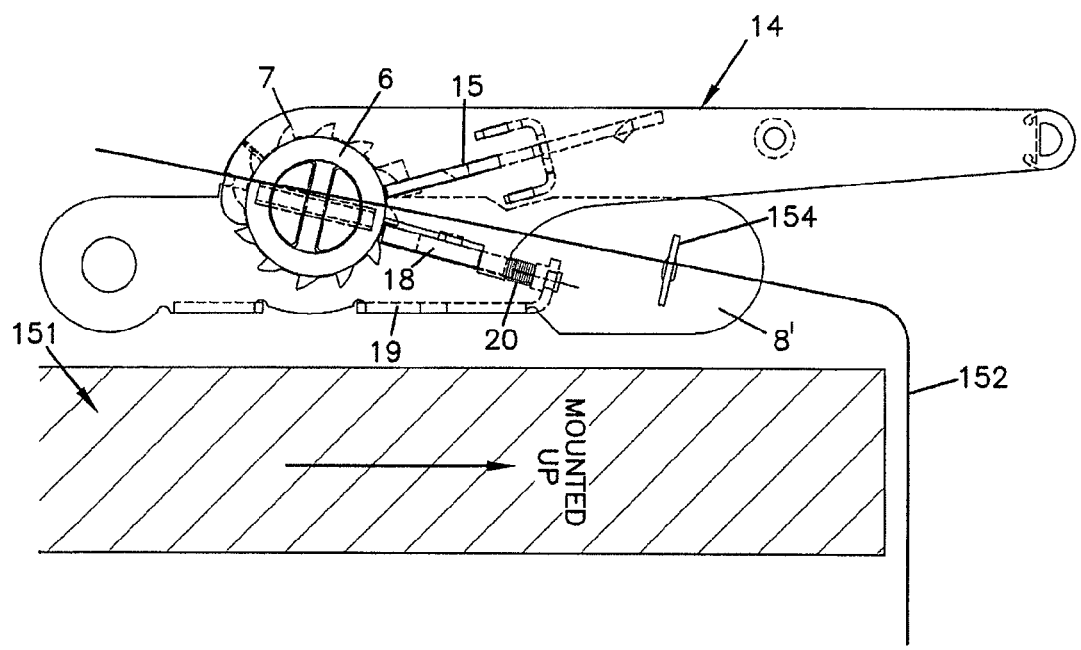

FIGS. 7A and 7B illustrate a second embodiment wherein the device 150 is utilized in a "pull" mode in connection with an open top trailer. In this device, the ratchet portions of the device may be constructed in a common fashion with the device 1a and 1b described above. However, the extended ends, guide mechanisms and anchor line attachment means are not required. Instead, the device 150 is secured to the side 151 of an open top trailer, box car or the like over which a tarp or other cover may need securing. Since the device 150 is attached to a fixed side, an anchor end is not required. The threadable strap 152 is connected to the tarp and or is secured over the top of the tarp and is fed through the rotation member 6. The rotation imparting member 14 is oriented in such a manner that a pull stroke (e.g., relative to the ground) may be employed. Instead of a guide member 12, a flat, generally rectangular member 154 may be located between the side members 8' and 9'. The flat member 154 has a slot formed therein to guide the strap 152.

Third Embodiment

Figure 8A:
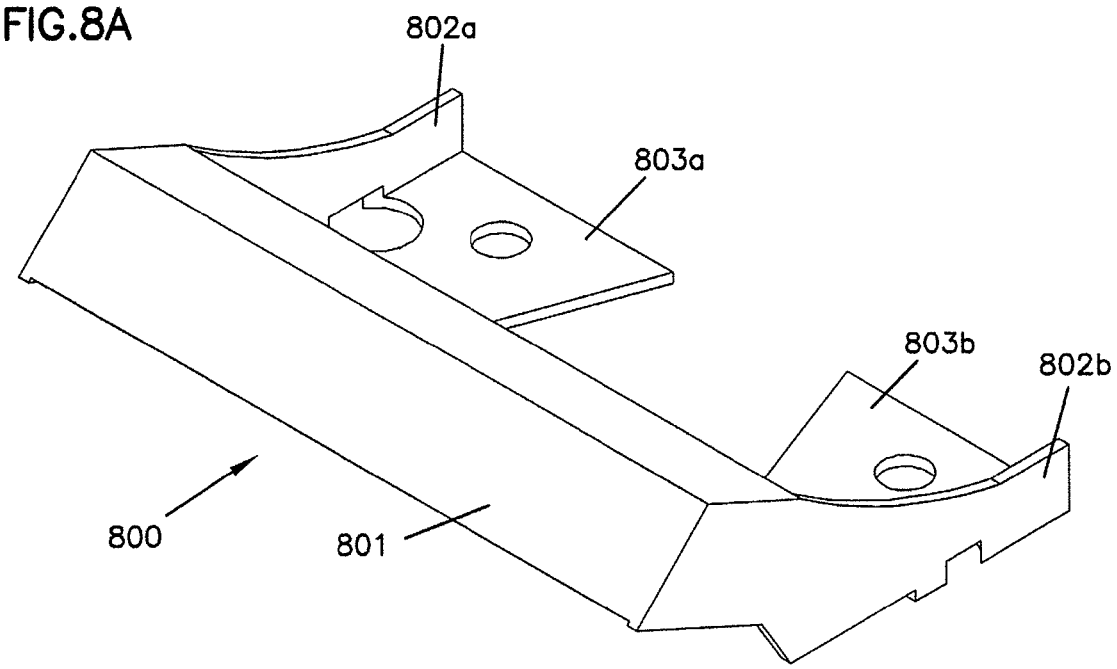
FIGS. 8A and 8B illustrate a third embodiment wherein the device includes an optional controllable tension release mechanism.
Figure 8B:
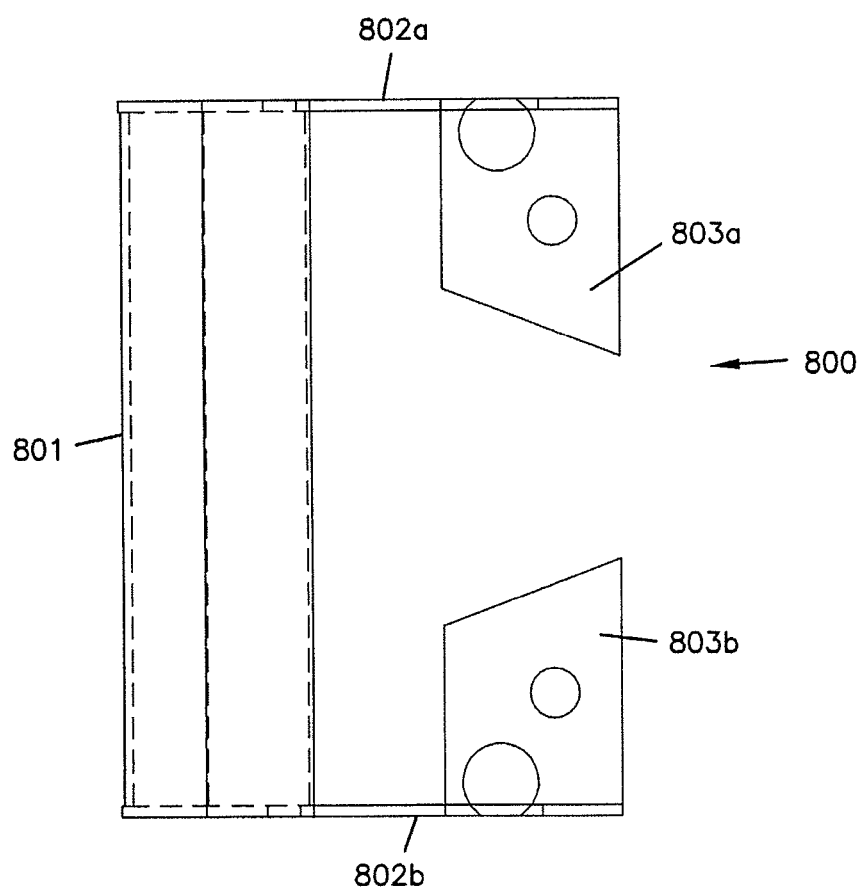

FIGS. 8A and 8B illustrate a third embodiment wherein the device 150 is utilized together with a optional controllable tension release mechanism 800. In this embodiment, the ratchet portions of the device may be constructed in a common fashion with the device 1a and 1b described above. The mechanism 800 is generally U-shaped and includes a handle-like structure 801 at the base of the "U", to supporting side legs 802a and 802b, and mounting flanges 803a and 803b connected to the ends of the supporting side legs 802a and 802b respectively. The mounting flanges 802a and 802b provide a location to secure the mechanism to the spring loaded locking mechanism 18. Preferably the connection may be implemented with bolts, welding, or other manner.

The handle portion 801 provides a means by which a user of the device can release the tension on the ratchet mechanism in a controlled manner. This is accomplished by selectively lifting the retaining elements of the spring loaded locking mechanism 18 from the ratchet wheel 7. By maintaining the handle portion 801, and therefore the spring loaded locking mechanism 18, lifted from the ratchet wheel, the tension is released. However, by briefly lifting the handle portion 801, a "tooth by tooth" release is accomplished.

While particular embodiments of the invention have been described with respect to its application, it will be understood by those skilled in the art that the invention is not limited by such application or embodiment or the particular components disclosed and described herein. It will be appreciated by those skilled in the art that other components that embody the principles of this invention and other applications therefore other than as described herein can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

The invention claimed is:

1. A tensioning device for tensioning a threadable line, the tensioning device comprising:
   i) a frame extending from a first end to a second end, the frame including two spaced parallel plate members and a support surface, and the frame configured to be fixedly secured to a side of a open top trailer;
   ii) a rotatable drive element mounted to the frame at the first end, the rotatable drive element defining a slot through which to receive the threadable line, wherein the drive element is rotated to wind and tension the threadable line;
   iii) at least one ratchet wheel integrally connected to the rotatable drive element, the ratchet wheel including directionally oriented notches, wherein the directionally oriented notches of the ratchet wheel are oriented so that the drive stroke direction is a pull stroke direction relative to a user of the tensioning device;
   iv) a pivot lever mounted to the rotatable drive element, the pivot lever including a drive pawl, wherein the drive pawl of the pivot lever entrains one of the directionally oriented notches of the ratchet wheel when pivoted in a drive stroke direction to rotate the drive element, and wherein the drive pawl passes over other directionally oriented notches of the ratchet wheel when pivoted in a return stroke direction;
   v) a blocking assembly coupled to the frame, the blocking assembly including a blocking pawl and a first spring, the first spring being mounted on the support surface of the frame to brace the blocking pawl into blocking engagement with the ratchet wheel;
   vi) a guide member coupled to the frame at the second end, the guide member defining a slot through which the threadable line is threaded prior to being wound on the drive element.

2. The tensioning device of claim 1, wherein the guide member guides the threadable line over the blocking assembly.

3. The tensioning device of claim 1, wherein a cam of each directionally oriented notch on the ratchet wheel is remote from the second end of the frame.

4. The tensioning device of claim 1, wherein the drive pawl of the pivot lever is U-shaped.

5. The tensioning device of claim 1, wherein the drive pawl of the pivot lever is mounted slidably counter to a bias of a second spring.

6. The tensioning device of claim 5, wherein the drive pawl includes a handle by which the drive pawl is configured to be slid from the ratchet wheel counter to the bias of the second spring.

7. The tensioning device of claim 1, wherein the pivot lever includes a control cam serving to transfer the blocking pawl into an inoperative position with respect to the ratchet wheel.

8. The tensioning device of claim 1, wherein the blocking pawl includes a handle by which the blocking pawl is configured to be slid from the ratchet wheel counter to the bias of the first spring.

9. A tensioning device comprising:
   i) a frame extending from a first end to a second end, the frame including two spaced parallel plate members and a support surface, the frame being configured to be fixedly secured to a side of an open top trailer, wherein the frame does not include an anchoring line attachment member;
   ii) a rotatable drive element mounted to the frame at the first end, the rotatable drive element defining a slot through which to receive a threadable line;
   iii) at least one ratchet wheel integrally connected to the rotatable drive element, the ratchet wheel including directionally oriented notches, wherein the directionally oriented notches of the ratchet wheel are oriented such that the drive stroke direction is a pull stroke direction relative to a user of the tensioning device;
   iv) a pivot lever mounted to the rotatable drive element, the pivot lever including a drive pawl, wherein the drive pawl of the pivot lever entrains one of the directionally oriented notches of the ratchet wheel when pivoted in a drive stroke direction to rotate the rotatable drive element, and wherein the drive pawl passes over other directionally oriented notches of the ratchet wheel when pivoted in a return stroke direction;
   v) a blocking assembly coupled to the frame, the blocking assembly including a blocking pawl and a first spring, the first spring being mounted on the support surface of the frame to brace the blocking pawl into blocking engagement with the ratchet wheel;
   vi) a guide member coupled to the frame at the second end, the guide member defining a slot through which the threadable line is threaded prior to being wound on the drive element.

10. The tensioning device of claim 9, wherein the guide member is generally rectangular.

11. The tensioning device of claim 9, wherein the drive pawl of the pivot lever is U-shaped.

12. The tensioning device of claim 9, wherein the drive pawl of the pivot lever is mounted slidably counter to a bias of a second spring.

13. The tensioning device of claim 12, wherein the drive pawl includes a handle by which the drive pawl is configured to be slid from the ratchet wheel counter to the bias of the second spring.

14. The tensioning device of claim 9, wherein the pivot lever includes a control cam serving to transfer the blocking pawl into an inoperative position with respect to the ratchet wheel.

15. The tensioning device of claim 9, wherein the blocking pawl includes a handle by which the blocking pawl is configured to be slid from the ratchet wheel counter to the bias of the first spring.

* * * * *